United States Patent [19]

Nishiyama

[11] Patent Number: 4,568,181

[45] Date of Patent: Feb. 4, 1986

[54] SIZE DETECTING DEVICE OF A COPY DOCUMENT SUITABLE FOR ELECTROPHOTOGRAPHIC COPYING MACHINE

[75] Inventor: Haruo Nishiyama, Nara, Japan

[73] Assignee: Sharp Kabushiki Kaisha, Osaka, Japan

[21] Appl. No.: 546,460

[22] Filed: Oct. 26, 1983

[30] Foreign Application Priority Data

| | | | |
|---|---|---|---|
| Oct. 28, 1982 | [JP] | Japan | 57-190340 |
| Oct. 28, 1982 | [JP] | Japan | 57-190339 |
| Oct. 28, 1982 | [JP] | Japan | 57-164244[U] |
| Oct. 28, 1982 | [JP] | Japan | 57-164246[U] |

[51] Int. Cl.[4] .............................................. G03B 27/52

[52] U.S. Cl. ................................. 355/75; 355/14 SH; 355/14 R

[58] Field of Search ................ 355/14 SH, 41, 61, 75, 355/3 SH, 76, 14 R; 356/40 D; 250/557, 571

[56] References Cited

U.S. PATENT DOCUMENTS

| | | | |
|---|---|---|---|
| 4,338,020 | 7/1982 | Yukawa et al. | 355/41 |
| 4,341,460 | 7/1982 | Kohyama | 355/14 SH |

*Primary Examiner*—L. T. Hix
*Assistant Examiner*—Della J. Rutledge
*Attorney, Agent, or Firm*—Birch, Stewart, Kolasch & Birch

[57] ABSTRACT

An electrophotographic copying machine comprises a device for detecting the size of a copy document on a document table. The device comprises a light receiving element. The light receiving element is responsive to the lying of a copy document on a document table for providing document size signals. A control circuit is responsive to the document size signals for calculating the size of the copy document.

18 Claims, 27 Drawing Figures

SIZE DETECTING DEVICE OF A COPY DOCUMENT SUITABLE FOR ELECTROPHOTOGRAPHIC COPYING MACHINE

BACKGROUND OF THE INVENTION

The present invention relates to an electrophotographic copying machine and, more particularly, to a device for detecting the size of a copy document on a document table for an electrophotographic copying machine.

An electrophotographic copying machine produces an electrostatic latent image on an optical-sensitive member. The latent image corresponds to an image on a copy document such as a manuscript or book to be copied. Toner particles are electrically adhered to the latent image, so that the latent image becomes visible to form a toner image.

The toner image is transferred onto copy paper via a transference charger. Depending upon the size of the copy document, the size of the copy paper should be selected. To properly select the copy paper size, some sensors must be provided adjacent the document table for detecting the size of the copy document.

Conventionally, some pairs of sensors are provided each of which comprises a light emitting element and a light receiving element. The number of said sensors correspond to the number of the kinds of copy paper the sizes of the papers to be detected. The light emitting element is positioned at the document cover which is pivotably mounted on the document table. The light receiving element is positioned beneath a document table plate. When a specific size copy document is positioned on the document table and the document cover covers the copy document on the document table plate, the copy document interrupts light from the light emitting element to the light receiving element. By detecting the light receiving element which is prevented from receiving the light, the specific size of the copy document can be detected.

In the above conventional device, it is difficult to detect the specific size of the copy document when the copy document is fairly transparent, so that the S/N ratio of the light receiving element is too poor to correctly detect the particular size of the copy document. Further, the light emitting element must be positioned on the document cover, so that careful consideration should be taken for problems in wiring the element and the document cover which must be pivotably activated. The document cover must be closed to cover the copy document on the document table.

Otherwise, only some light receiving elements are positioned beneath the document table cover. When the copy document is positioned on the document table plate, the copy document interrupts the surrounding light from being incident upon the light receiving element. The copying machine is responsive to the output from the light receiving element for detecting the size of the copy document.

Since each of these elements is directed to detect an individual size of a plurality of copy documents, error detection could not be avoided, in particular, when the copying machine is operated in the dark.

Therefore, it is desired to provide an improved detection device for detecting the sizes of the copy documents on the document table which prevents in detection.

SUMMARY OF THE INVENTION

Accordingly, it is an object of the present invention to provide an improved device for detecting the size of a copy document on a document table.

It is another object of the present invention to provide an improved device for detecting the size of a copy document on a document table based on the difference between the outputs of sensors.

It is a further object of the present invention to provide an improved electrophotographic copying machine comprising a device for detecting the size of a copy document on a document table based on the difference between the outputs of sensors.

Briefly described, in accordance with the present invention, an electrophotographic copying machine comprises a device for detecting size of a copy document on a document table. The device comprises a light receiving element responsive to the lying of the copy document onto the document table for providing document size signals. The copying machine comprises a control circuit responsive to the document size signal levels for calculating the size of the copy document.

BRIEF DESCRIPTION OF THE DRAWINGS

The present invention will become more fully understood from the detailed description given hereinbelow and the accompanying drawings which are given by way of illustration only, and thus are not limitative of the present invention and wherein.

DESCRIPTION OF THE INVENTION

Figure 1:
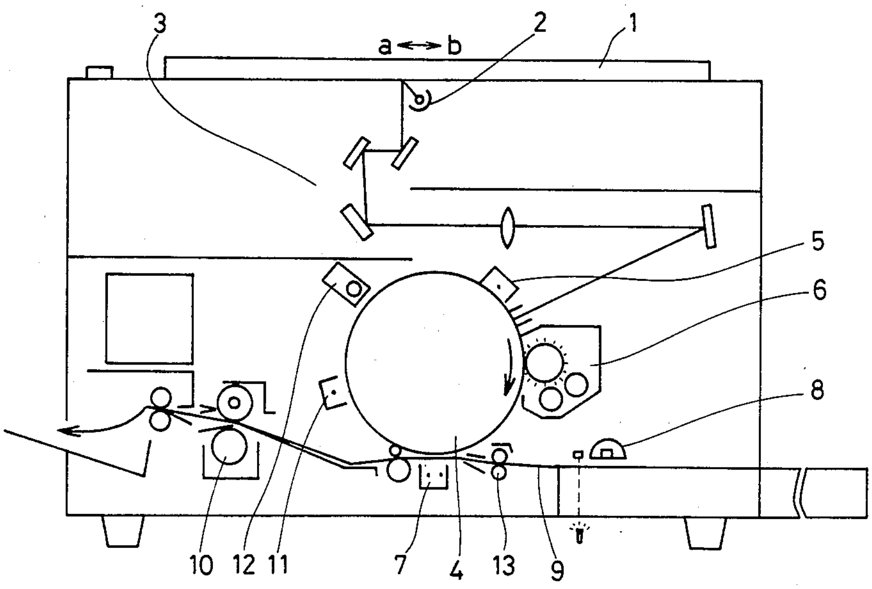
FIG. 1 shows a sectional view of an elecrophotographic copying machine according to the present invention.

FIG. 1 shows a sectional view of an electrophotographic copying machine of the present invention. A type of electrophotographic copying machine for reciprocating a document table for carrying a copy document such as a manuscript or book is shown. However, it should be noted that the present invention can be applied to another type of electrophotographic copying machine comprising part of an optical scanning system including lenses and mirrors, the part being moved along the document table.

The electrophotographic copying machine of FIG. 1 comprises a document table 1, a light source 2, an optical system 3, an optical-sensitive member 4, a precharger 5, a developing section 6, a transference charger 7, a paper pick-up roller 8 and a pair of paper supply rollers 13 for a paper 9, an image fixing device 10, a charge removal charger 11, and a cleaner 12.

The document table 1 is positioned at the top of the copying machine. The table 1 can be reciprocated in the directions a and b. On the table 1, a copy document such as a manuscript or book is disposed to which light is projected by the light source 2. The optical system 3 is used to focus a reflected image from the copy document onto the optical-sensitive member 4. The optical system 3 comprises lenses and mirrors for this purpose.

The optical scanning system 3 is fixed while the table 1 is moved. Otherwise, it may be possible that part of the lenses and the mirrors forming the optical scanning system 3 is moved while the table 1 are fixed.

The optical-sensitive member 4 is formed around a drum. The pre-charger 5 is provided for uniformly pre-charging the optical-sensitive member 4 before the member 4 receives the reflected image.

Responsive to the reflected light image from the copy document, an electrostatic latent image is formed on the optical-sensitive member 4. The developing section 6 is provided for changing the latent image into visible toner image. The transference charger 7 is provided for electrostatically transferring the toner image to the paper 9 which is picked up by the paper pick-up roller 8. The image fixing device 10 is provided for fixing the toner image on the paper 9, so that the image on the copy document is copied on the paper 9.

After the toner image is transferred to the paper 9, the remaining charges on the optical-sensitive member 4 are removed by the charge-removal charger 11. The cleaner 12 is provided for cleaning the toner particles remaining on the optical-sensitive member 4.

Responsive to a paper pick-up signal generated in response to the generation of a copy start signal, the paper pick-up roller 8 is rotated a full turn, so that a single sheet of the paper 9 is picked up. The picked-up paper 8 stops at the position of the pair of paper supply rollers 13. This is because the leading edge of the latent image on the optical-sensitive member 4 must correspond to the leading edge of the picked-up paper 9. Responsive to a position detection signal developed at the time when the document plate 1 is on the way in the light exposure direction b, the pair of paper supply rollers 13 are rotated to start the supply of the paper 9.

Attention is now directed to a first preferred embodiment of the present invention as shown in FIGS. 2–8.

Figure 2:
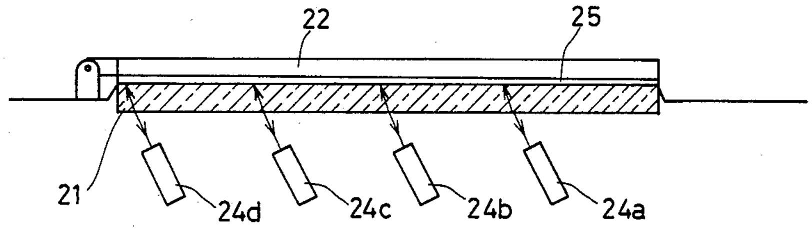
FIGS. 2, 5, and 7 show a sectional view of a device for detecting the size of a copy document onto a document table according to a first preferred embodiment of the present invention.
Figure 3:
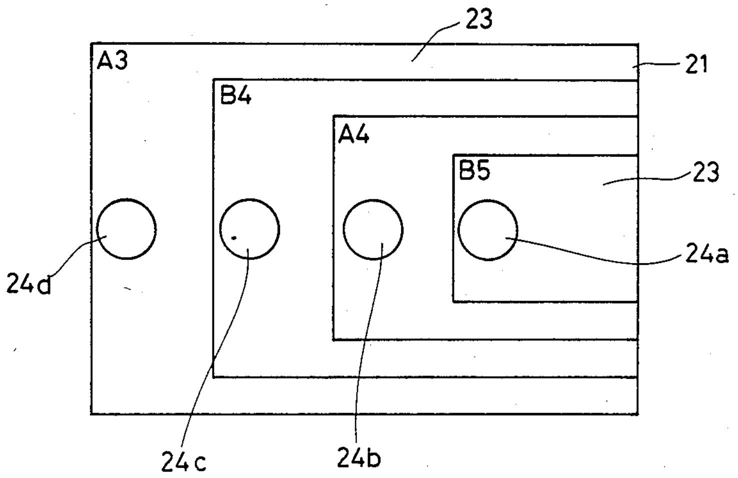
FIG. 3 shows a plan view of the document table of FIG. 2.
Figure 5:
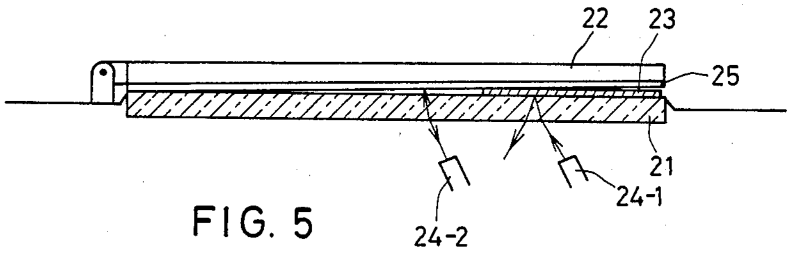
Figure 7:
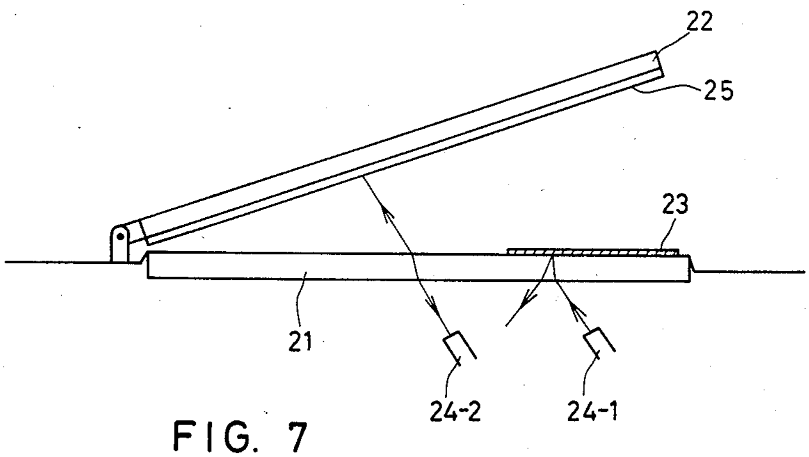

FIGS. 2, 5, and 7 show a sectional view of a size detecting device of a copy document according to the first preferred embodiment of the present invention, respectively. FIG. 3 shows a plan view of the size detecting device according to the first preferred embodiment of the present invention.

The device comprises preferably four sensors 24, a document table plate 21, a document cover 22. A copy document 23 is disposed onto the plate 21 as described above.

As FIG. 2 shows, the sensors 24 are positioned under the plate 21, but, obliquely positioned in connection with the surface of the plate 21, so that the sensors 24 cannot receive the copy document scanning light from the light source 2 reflected by the copy document 23. Each of the sensors 24 comprises a light emitting element such as a light emitting diode (LED), and a light receiving element such as a photodiode. The LED and the light receiving element are arranged adjacent and on a line. The document cover 22 is pivotably provided on the plate 21.

As FIG. 3 shows, the copy document 23 is positioned so that the bottom side of the copy document 23 is contact with the bottom side of a copy area of the plate 21.

The sensors 24 are aligned along the center line of the copy area. The top of the document 23 should be positioned at the top side of each of the copy areas.

It is not intended in FIG. 3 that the sensors 24 are visible from the upright position, although they appear to be in FIG. 3. It is intended in FIG. 3 that the respective sensors 24 are related to the particular sizes of the copy document 23.

With reference to FIG. 3, each of the sensors 24 is directed to detect each of the copy document sizes. More particularly, a sensor 24*a* is disposed at the position that a B5 size paper which is the smallest size that can interrupt the light from the LED of itself to the light receiving element of itself. A sensor 24*b* is disposed at the position that an A4 size copy document 23 can interrupt the light from the LED of itself to the light receiving element of itself and that the B5 size copy document 23 cannot interrupt the light from the LED of itself to the light receiving element of itself. A sensor 24*c* is disposed at the position that a B4 size copy document 23 can interrupt the light from the LED of itself to the light receiving element of itself and that the A4 size copy document 23 cannot interrupt the light from the LED of itself to the light receiving element of itself. A sensor 24*d* is disposed at the position that an A3 size copy document 23 can interrupt the light from the LED of itself to the light receiving element of itself and that the B4 size copy document 23 cannot interrupt the light from the LED of itself to the light receiving element of itself.

Figure 4:
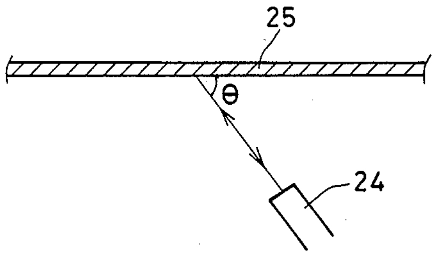
FIGS. 4, 11, 16, and 22 show an operational principle of a reflective sheet adapted for the present invention.

On the inner surface of the document cover 22 confronting the copy document 23 on the document table plate 21, a reflective sheet 25 is layered over the entire surface of the document cover 22. As FIG. 4 shows, the reflective sheet 25 reflects light from the LED toward the light receiving element in the confronting direction as the light-incident direction because it is made of a specific material. The reflective sheet 25 may be a sheet comprising a great number of glass beads embedded within a plastic base. Such a sheet is sold under the trade name "SCOTCHLITE" by SUMITOMO 3M LTD Japan. The reflective sheet 25 can provide high intensity light which is greater than the remaining light as reflected by the copy document 23.

Figure 6:
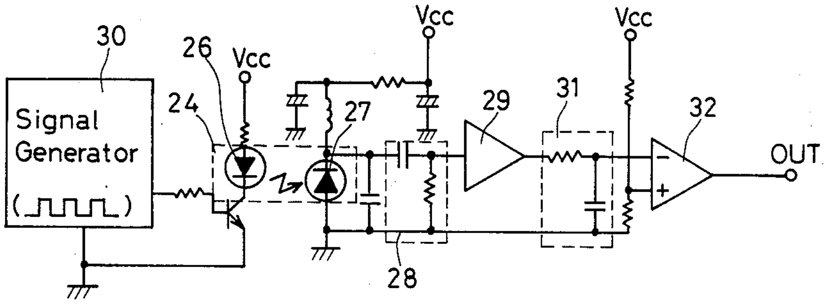
FIG. 6 shows a block diagram of a lying detection circuit of a copy document according to the first preferred embodiment of the present invention.

When the copy document 23 is positioned on the document table plate 21 as described above, according to the present invention, the lying of the copy document 23 can be detected by a lying detecting circuit of the copy document 23 as follows. FIG. 6 shows a block diagram of the lying detecting circuit.

After the document cover 22 moves to cover the copy document 23 or, a copy start signal is developed by the copying machine in response to a copy start command inputted by the operator, the LED of at least one of the sensors 24 is activated to emit light toward the copy document 23. Therefore, the copy document 23 interrupts the light from the LED of said sensor, for example, 24-1 while the light from the LED of another sensor 24-2 cannot be interrupted by the copy document 23. The light from the LED of the sensor 24-1 is reflected or absorbed by the copy document 23, so that the light from this LED cannot be incident upon the reflective sheet 25 and the light receiving element of the sensor 24-1 cannot receive any light. When the sensor 24-1 connot receive reflected light due to the lying of the copy document 23 on the document table plate 21, the lying detecting circuit of FIG. 6 outputs a high level signal "H" for indicating this situation as an output signal corresponding to the sensor 24-1.

On the other hand, the LED of the sensor 24-2 is incident upon the reflective sheet 25, so that the reflective sheet 25 reflects the light toward the light receiving element of the sensor 24-2. The light receiving element of the sensor 24-2 receives the light from the reflective sheet 25, so that the lying detecting circuit of FIG. 6 outputs a low level signal "L" corresponding to the sensor 24-2.

With reference to FIG. 6, as to each one of the sensors 24*a* to 24*d*, the lying detecting circuit comprises the sensor 24 including the LED 26 and the light receiving element 27, a signal generator 30, a differential circuit 28, an amplifier 29, an integration circuit 29, and a comparator 32.

The LED 24 is responsive to the pulse signals from the signal generator 30 for being modulated and emitting light while the document cover 22 moves to cover the copy document 22. The output of the light receiving element 27 is applied to the amplifier 29 via the differential circuit 28. The output of the amplifier 29 is entered into the minus input terminal of the comparator 32 via the integration circuit 31. To the minus input terminal of the comparative 32, a comparated voltage is to be applied. To the plus input terminal of the comparator 32 to which a reference voltage is to applied, a voltage divided by resistors from a power voltage +VCC is applied.

With the help of the circuit of FIG. 6, while the copy document 23 is not disposed on the document table plate 21, the light from the LED 26 is incident upon the light receiving element via the reflective sheet 25. The output of the light receiving element 27 is amplified by the amplifier 29. When the amplified voltage from the amplifier 29 is greater than the reference voltage to the comparator 32, the comparator 29 outputs the low level signal "L".

On the other hand, when the copy document 23 is lying on the plate 21, the light receiving element 27 scarcely receives the light, so that the output of the amplifier 29 is smaller than the reference voltage to the comparator 32 and the comparator 32 outputs the high level signal "H". The voltage of the reference voltage is selected so that it is smaller than the output of the amplifier 29 when the copy document 23 is not lying on the plate 21.

Since the lying detecting circuit of FIG. 6 is provided for the respective sensors 24*a* to 24*d*, the outputs of the comparators 32 as to these respective sensors can indicate the presence of a particular size copy document 23.

After the information of a particular size copy document 23 is obtained, the respective signal generators 30 stop to activate the LEDs 26.

When the copy document 23 is transparent, the light from the LED 26 can pass the copy document 23 to be incident upon the reflective sheet 25, so that the reflective sheet 25 reflects the light toward the light receiving element 27 through the copy document 23. However, since the light travels thorough the copy document 23 twice, the light intensity is remarkably reduced when the light receiving element 27 receives the light. Therefore, the light intensity received by the light receiving element 27 is substantially identical with the case when the opaque copy document 23 is disposed, so that a high S/N ratio of the light from the LED 26 can be obtained.

Regardless whether the document cover 22 is opened or closed, the output of the light receiving element 27 is unchanged as it depends only upon the presence of the copy document 25. In other words, when the cover 22 is closed and the copy document 23 is disposed to cover a specific area of the copy area, the light receiving element 27 of a related sensor 24 cannot receive any light and, when the copy document 23 is not disposed to cover a specific area of the copy area and the cover 22 is closed, the light receiving element 27 of a related sensor 24 can receive the reflected light. While the cover 22 is opened, as FIG. 7 shows, even when the copy document 23 is not disposed to cover a specific area of the copy area, the light receiving element 27 of a related sensor 24 can receive the light reflected by the reflective sheet 25. For this purpose, the sensors 24 are in a tilted position with respect the cover 22 carrying the reflective sheet 25.

Even when the copy document 23 is incorrectly disposed on the plate 21, the light receiving element of at least one sensor can receive the light reflected by the reflective sheet 25. This means that any size of the copy document 23 can be detected accurately, according to the present invention.

The following TABLE I shows a relation between the copy document sizes and the output levels of the respective comparators of the sensors 24.

TABLE I

| SIZES/SENSOR | 24a | 24b | 24c | 24d |
|---|---|---|---|---|
| A3 | H | H | H | H |
| B4 | H | H | H | L |
| A4 | H | H | L | L |

TABLE I-continued

| SIZES/SENSOR | 24a | 24b | 24c | 24d |
|---|---|---|---|---|
| B5 | H | L | L | L |
| SMALLER THAN B5 | L | L | L | L |

As TABLE I shows, for example, when the A3 size document 23 is disposed on the plate 21, the light emitted by the LEDs of the sensors **24*a*–24*d* cannot reach the respective light receiving elements. The output levels of the comparators 32** of these sensors are all "H".

Figure 8:
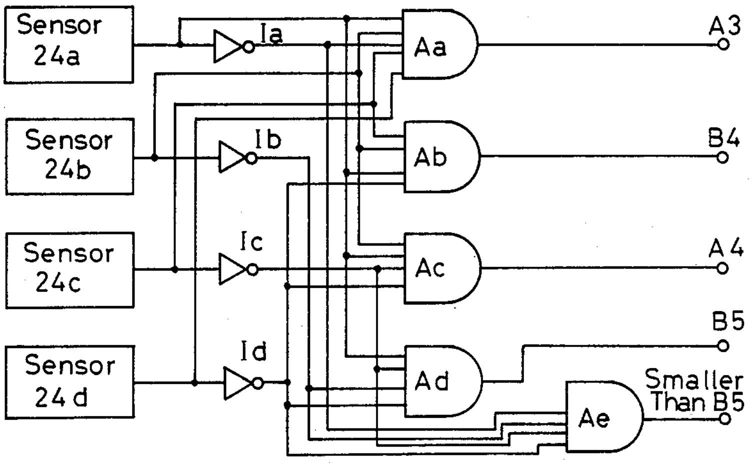
FIG. 8 shows a size detection circuit of a copy document according to the first preferred embodiment of the present invention.

FIG. 8 shows a block diagram of a size detecting circuit according to the first embodiment of the present invention. The circuit of FIG. 8 comprises the four comparators 32 of the sensors **24*a*–24*d***, four inverters Ia–Id, and five AND gates Aa–Ae.

With reference to FIG. 8, the outputs of the comparators 32 of the sensors **24*a*–24*d* are entered into the four AND gates Aa–Ad directly via the four inverters Ia–Id. The AND gates Aa–Ad output A3, B4, A4, and B5 size detection signals, respectively. The AND gate Ae receives the outputs of the comparators 32 of the sensors 24*a*–24*d*** via the four inverters Ia–Id, so that the AND gate Ae outputs a size detection signal of a document size smaller than B5.

Responsive to the outputs of the five AND gates Aa–Ae, a control circuit of the electrophotographic copying machine provides a control signal necessary for pulling in a detected size copy paper. For this purpose, for example, the copying machine has detected some kinds of copy papers which are attached to the copy machine. The control circuit serves to compare the size detection signals of the five AND gates Aa–Ae and attachment paper size detection signals, so that any appropriate size copy papers are pulled into the copying machine automatically.

Attention is now directed to a second preferred embodiment of the present invention.

Figure 9:
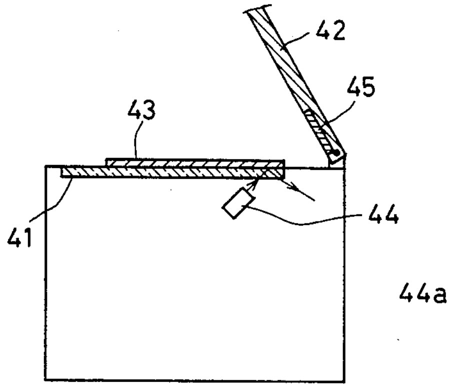
FIGS. 9 and 12 show a sectional view of a size detecting device of a copy document according to a second preferred embodiment of the present invention.
Figure 10:
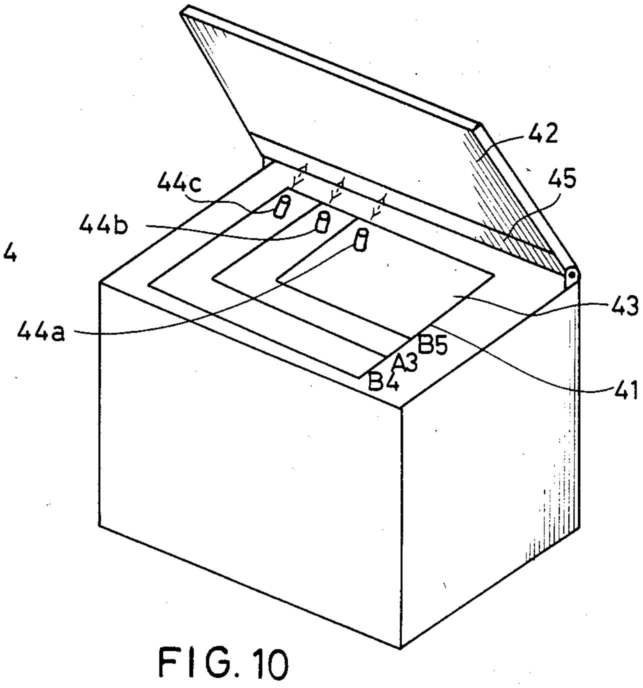
FIG. 10 shows a perspective view of the device of FIG. 9.
Figure 11:
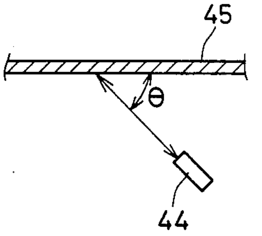
Figure 12:
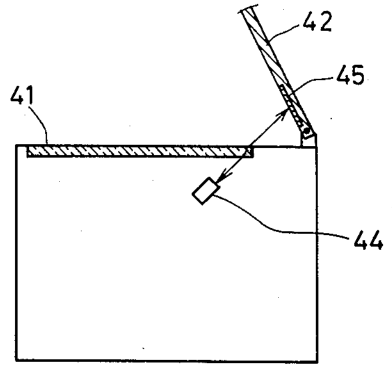

FIGS. 9 and 12 show a sectional view of a document size detection device according to a second preferred embodiment of the present invention. FIG. 10 shows a perspective view of the device. FIG. 11 shows an operational view of a reflective sheet adapted for the present invention.

In this second preferred embodiment, there are provided a document plate 41 made of a transparent glass plate, a document cover 42, a copy document 43, and a plurality of sensors 44 each comprising an LED and a light receiving element.

As FIG. 10 shows, the copy document 43 is disposed on the document plate 41 so that the sides of the copy document 43 meet with the copy area on the plate 41 at the topmost and right side. The sensors **44*a*–44*c* are arranged at rather left positions of the respective copy areas. The sensors 44 are positioned so as not to disturb the optical scanning light from the light source 2. They are disposed beneath the plate 41 and obliquely directed toward the plate 41, so that the light from the respective LEDs can be incident upon a reflective sheet regardless of whether the document cover 42** is open or closed.

The sensors **44*a*, 44*b*, and 44*c* are directed to detect the lying of the sizes B5, A4, and B4 of the copy document 43**, respectively.

A reflective sheet 45 is provided on the cover 42. The reflective sheet 45 is of a nature similar to that of like reflective sheet 25. As FIG. 9 shows, the reflective sheet 45 should be layered on the cover 42 at the position not to disturb the optical scanning light from the light source 2.

In the same manner as described in connection with the first preferred embodiment, the sensors 44 emit light toward the reflective sheet 45. Depending upon the presence of the copy document 43 on the plate 41 and regardless of whether the cover 42 is open or closed, the light receiving elements of the respective sensors 44 can and cannot receive light.

Figure 13:
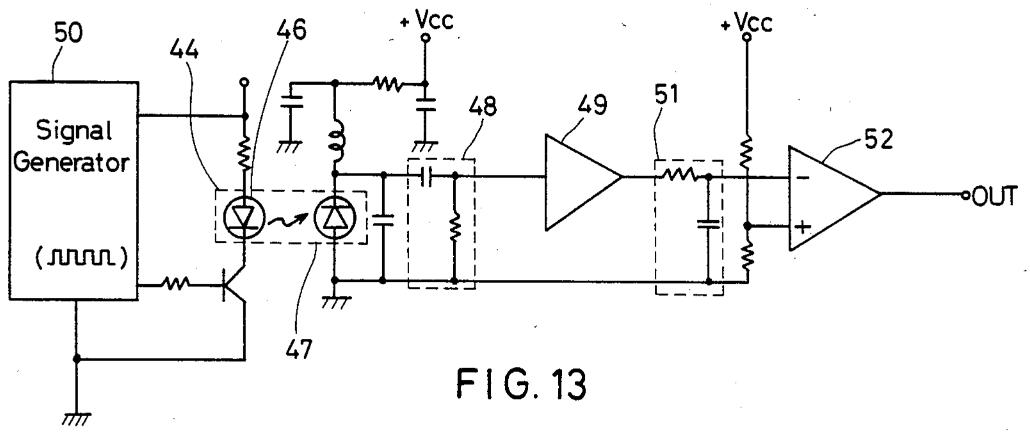
FIG. 13 shows a lying detecting circuit of a copy document for the second preferred embodiment of the present invention.

FIG. 13 shows a block diagram of a lying detecting circuit of the copy document 43.

As to the respective sensors 44, the circuit of FIG. 13 comprises the sensor 44 including an LED 46 and a light receiving element 47, a signal generator 50, a differential circuit 48, an amplifier 49, an integration circuit 51, and a comparator 52. When the copy document 43 is not lying on the table 41, the comparator 52 outputs the low level signal "L". When the copy document 43 is lying on the plate 41, the comparator 52 outputs the high level signal "H". The operation of the circuit of FIG. 13 is the same as that of the circuit of FIG. 6, so that any further description with respect thereto is omitted.

TABLE II shows relation between the document sizes and the output levels of the comparators 52 as related to the respective sensors 44.

TABLE II

| SIZES/SENSORS | 44a | 44b | 44c |
|---|---|---|---|
| B4 | H | H | H |
| A4 | H | H | L |
| B5 | H | L | L |
| SMALLER THAN B5 | L | L | L |

Figure 14:
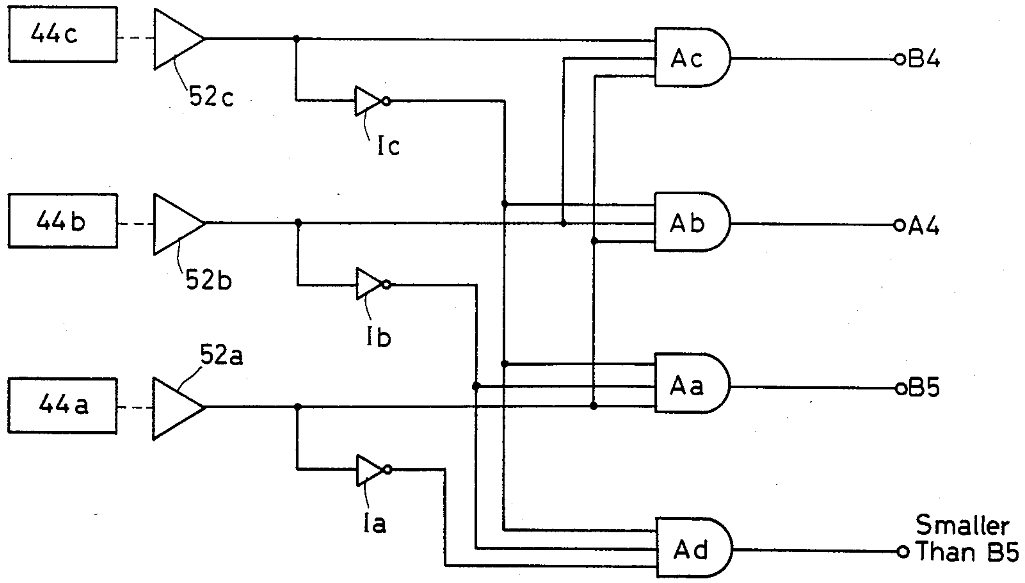
FIG. 14 shows a circuit diagram of a size detecting circuit of a copy document according to the second preferred embodiment of the present invention.

FIG. 14 shows a block diagram of a size detection circuit according to the second preferred embodiment of the present invention.

The circuit of FIG. 14 comprises the comparators 52 of the respective sensors 44, three inverters Ia–Ic, and four AND gates Aa–Ad.

The AND gate Ac outputs a B4 size detection signal. The AND gate Ab outputs an A4 size detection signal. The AND gate Aa outputs a B5 size detection signal. The AND gate Ad outputs a size detection signal of a paper smaller than the B5 size.

Further attention is now directed to a third preferred embodiment of the present invention in which only a single sensor is provided for detecting the size of the copy document. According to this preferred embodiment, the size of the copy document is detected by detecting the edges of the document while the single sensor is being tilted.

Figure 15:
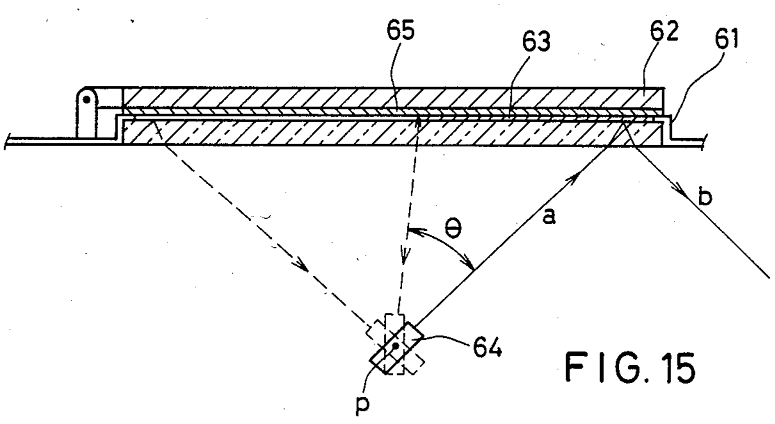
FIGS. 15 and 19 show a sectional view of a size detecting circuit of a copy document according to a third preferred embodiment of the present invention.
Figure 16:
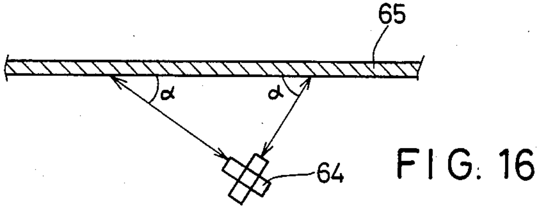

FIG. 15 shows a sectional view of a size detecting device according to the third preferred embodiment of the present invention. The device of FIG. 15 comprises a document cover plate 61, a document cover 62, a copy document 63, a sensor 64, and a reflective sheet 65. The sensor 64 comprises an LED and a light receiving element. These elements correspond to those of the above described embodiments, so that further description with respect thereto is omitted.

As FIG. 15 shows, the LED emits light in a direction normal to the incident direction. The intensity of the reflected light from the reflective sheet 65 is stronger than the light reflected by the document cover 62. The sensor 64 is pivotally mounted around a fulcrum P to provide optical scanning of the copy document 63 on the plate 61.

While the copy document 63 is disposed on the plate 61, the light from the LED is reflected by the reflective sheet 65, so that the reflected light is received by a light receiving element 642 even when the sensor 64 is tilted. Wherever the sensor 64 directs the light toward the copy document 63 while it is pivotally tilted and the element 642 can receive the reflected light, it is meant that some document 63 is not mounted on the plate 61. Otherwise, whenever the document 63 is mounted on the plate 61, the light receiving element 642 of the sensor 64 cannot receive any light since the light toward the document 63 from the LED of the sensor 63 is absorbed or reflected as a reflected ray b. Thus, the presence of the document 63 can be detected.

While the sensor 64 is tilted and as soon as the sensor 64 directs light outside the edges of the document 63 mounted on the plate 61, the light receiving element 642 of the sensor 64 starts to receive the light reflected by the sheet 65. At this time, the light receiving element outputs a light receiving signal. By detecting the tilt angle of the senosr 64, the size of the document 63 mounted on the plate 61 can be detected.

Figure 17:
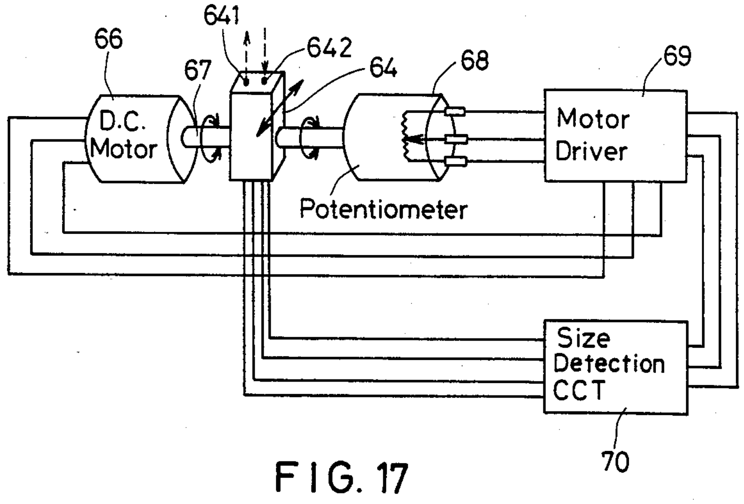
FIG. 17 shows a block diagram of a size detecting circuit of according to the third preferred embodiment of the present invention.

FIG. 17 shows a block diagram of the document size detection circuit of the present invention.

The circuit of FIG. 17 comprises a D.C. motor 66, a shaft 67, the sensor 64 comprising the LED 641 and the light receiving element 642, a potentiometer 68, a motor driver circuit 69, and a size detection circuit 70.

The sensor 64 is mounted on the shaft 67 of the D.C. motor 66, so that the sensor 64 can be tilted to direct its light toward the plate 61. The rotation angle of the shaft 67 is changed into voltage data by the potentiometer 68. The voltage data is applied to the motor driver circuit 69, so that the driver circuit 69 controls the rotation of the motor 66 in accordance with the voltage data obtained by the potentiometer 68.

When the sensor 64 is positioned at the starting point, the motor circuit 69 permits the sensor 64 to be tilted by positively rotating the motor 66. After the sensor 64 is tilted up to the position that the element 642 can receive the reflected light, so that the tilt data of the sensor 64 are changed into voltage data by the potentiometer 68, the voltage data are inputted into the driver circuit 69 to reverse rotation of the motor 66 in order to return the sensor 64 to the starting position.

Based on the voltage data from the potentiometer 68, motor driver circuit 69 provides angle data into the size detection circuit 70, the angle data corresponding to the tilt angle of the sensor 64. The size detection circuit 70 controlls the light emission from the LED 641 of the sensor 64. Responsive the the input of the light receiving signal from the element 642, the detection circuit 70 receives the angle data of the sensor 64 from the motor drive circuit 69, so that the detection circuit 70 detects the size of the document 63 based upon the angle data of the sensor 64 according to prescribed information between the paper sizes and the angle data.

Figure 18:
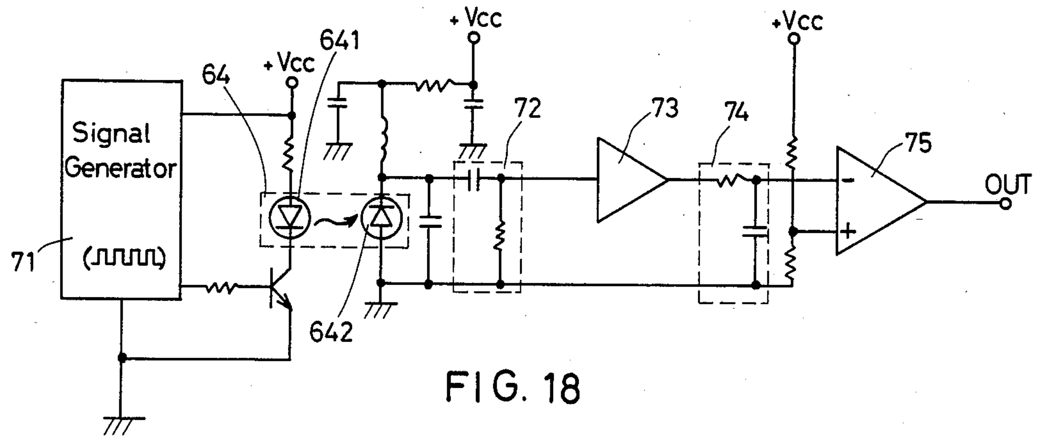
FIG. 18 shows a block diagram of a lying detecting circuit of a copy document for the third preferred embodiment of the present invention.
Figure 19:
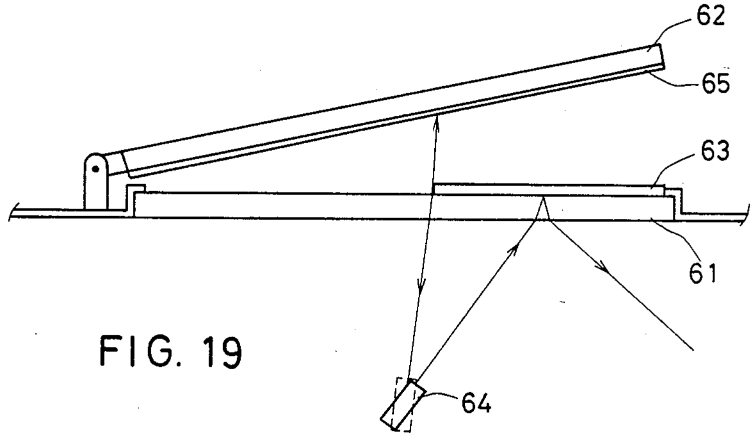

FIG. 18 shows a block diagram of the size detection circuit 70.

The circuit of FIG. 18 comprises a signal generator 71, the sensor 64, a differential circuit 72, an amplifier 73, an integration circuit 74, and a comparator 75. The operation of this circuit is the same as that of the circuit of FIG. 6, so that detailed description with respect thereto is omitted.

When the document 63 is not mounted on the plate 61, the comparator 75 outputs the low level signal "L". When the document 63 is mounted on the plate 61, the comparator 75 outputs the high level signal "H". When the sensor 64 is tilted to direct its light outside the edges of the document 63, the element 642 receives the reflected light, so that the comparator 75 changes the output from the high level signal "H" to the low level signal "L". Thus, the edges of the document 63 can be detected. Responsive to the signal from the element 642, the detection circuit 70 receives the angle data of the sensor 64 via the motor driver circuit 69, so that the size of the document 63 can be detected on the basis of the angle data of the sensor 64.

Figure 20:
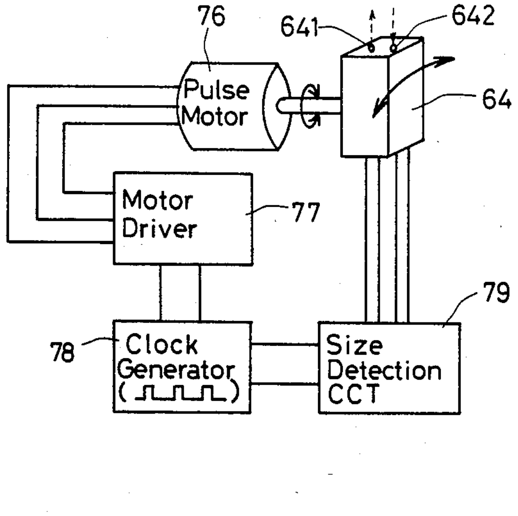
FIG. 20 shows a block diagram of a size detecting circuit according to a fourth preferred embodiment of the present invention.

FIG. 20 shows a block diagram of a size detection circuit of the present invention.

The circuit of FIG. 20 comprises a pulse motor 76, the sensor 64, a motor driver circuit 77, a clock generator 78, and a size detection circuit 79. This circuit detects the document size by changing the tilt angle of the sensor 64 into time data of the tilting sensor 64.

The sensor 64 is tilted by the rotation of the pulse motor 76. The pulse motor 76 is rotated by the motor driver circuit 77 operated by the clock pulses from clock generator 78. The rotation angle of the motor 76 corresponds to the number of the clock pulse. The pulse number is counted by the motor driver circuit 77. When the sensor 64 is tilted up to the last position, the motor 76 is reverse rotated to set the sensor 64 at the initial position. The clock pulse from the generator 78 is entered into the detection circuit 79, so that the circuit 79 starts to count the tilt operation of the sensor 64 from the initial position.

When the output of the comparator 75 of FIG. 18 changes the high level signal "H" to the low level signal "L", the detection circuit 79 stops to count the clock pulse number, so that the circuit 79 detects the size of the document 63 according to prescribed information between the paper sizes and the clock pulse numbers. The larger the document size becomes, the greater the clock pulse number becomes.

In the above third preferred embodiment, the sensor 64 is disposed at one side of the plate 61. It may be evident that it is unnecessary to limit the position of the sensor 64 since the distance between the edges of the plate 61 and the point where the sensor 64 detects the leading edge of the document is subtracted from the distance between the edge of the plate and the position where the sensor 64 detects the rear edge of the document, so that the document size can be calculated.

Further attention is now directed to a fourth preferred embodiment of the present invention in which a single sensor travels along the document to be detected.

Figure 21:
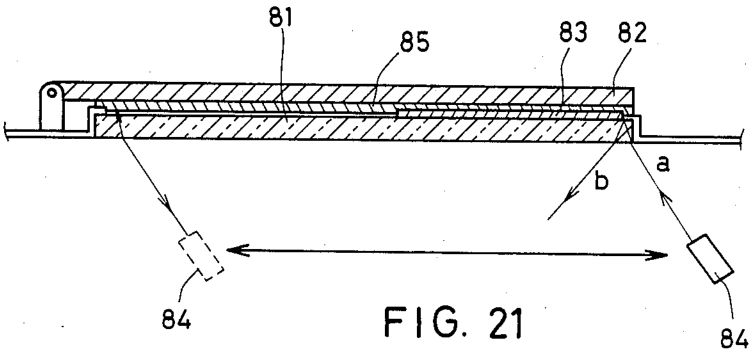
FIGS. 21 and 24 show a sectional view of a size detecting device according to a fifth preferred embodiment of the present invention.
Figure 22:
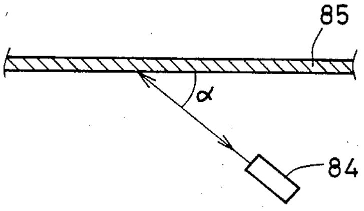
Figure 23:
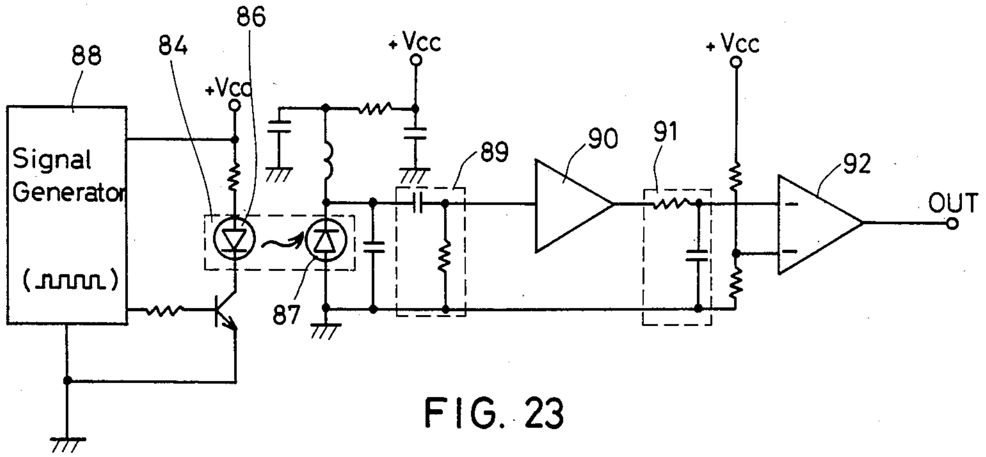
FIG. 23 shows a block diagram of a lying detecting circuit for a fifth preferred embodiment of the present invention.
Figure 24:
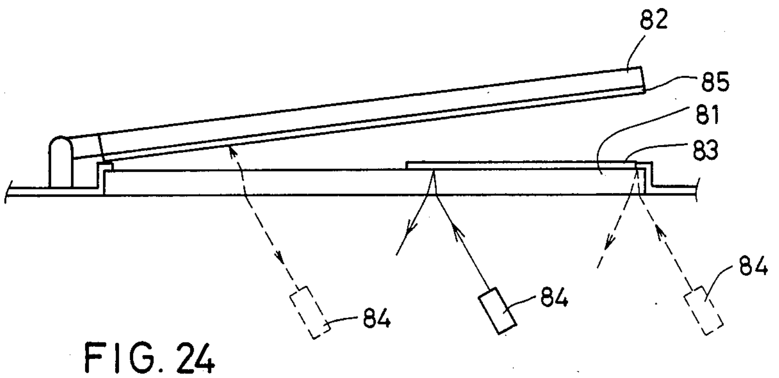
Figure 25:
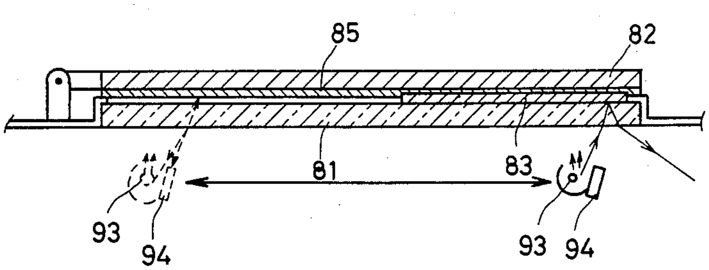
FIG. 25 shows a sectional view of a size detecting device of a copy document according to a sixth preferred embodiment of the present invention.
Figure 26:
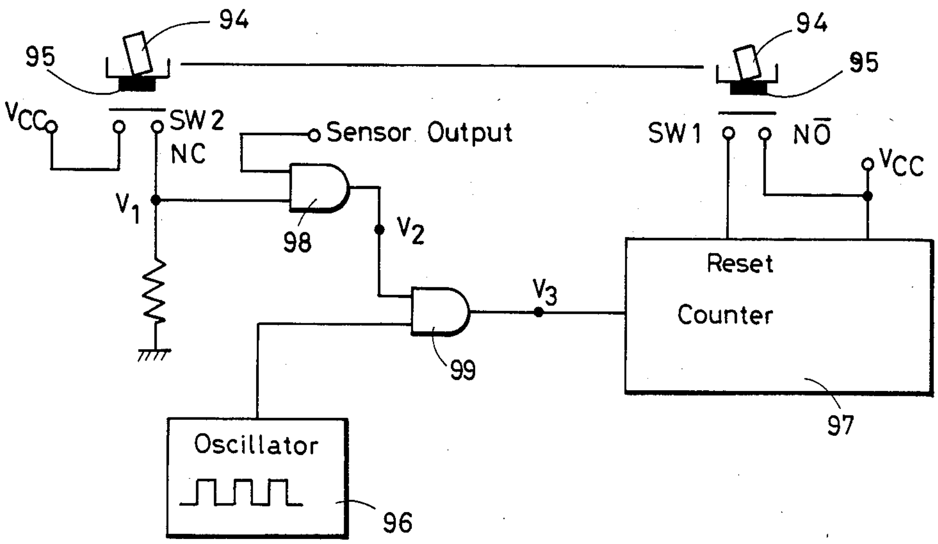
FIG. 26 shows a block diagram of a counting circuit for counting the travel time of a sensor.
Figure 27:
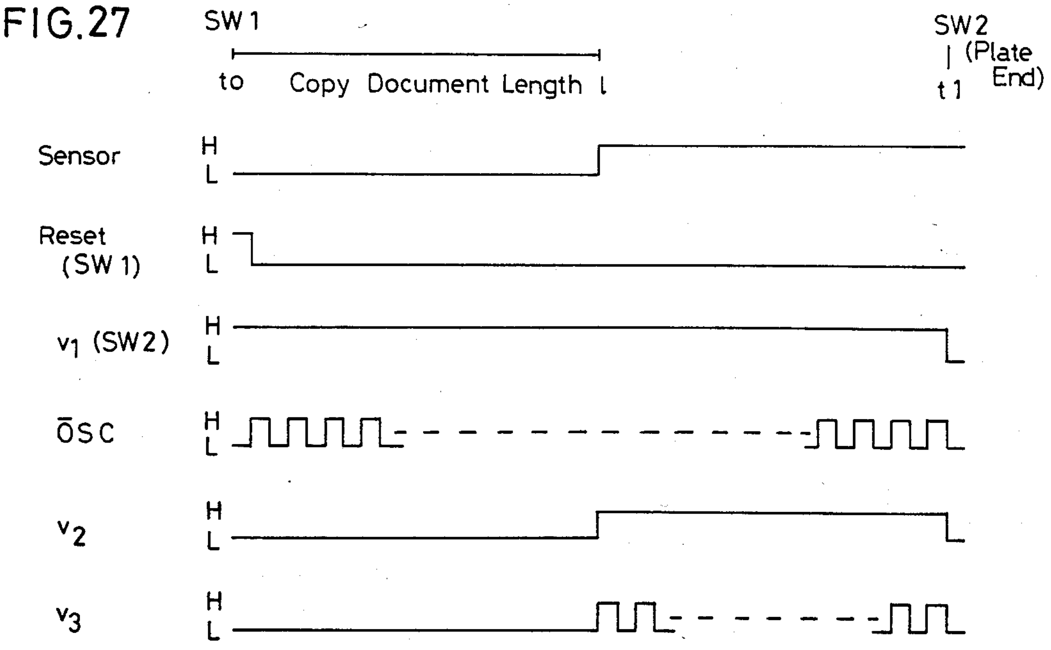
FIG. 27 shows a timing chart of the pulse signals occurring within the circuit of FIG. 26.

FIGS. 21, 24 and 25 show a sectional view of a size detection device of the present invention. FIG. 22 shows a principal operation of the reflective sheets adapted for the present invention. FIGS. 23 and 26 show a block diagram of a circuit of the present invention. FIG. 27 shows a timing chart of the circuit of FIG. 26.

Referring now to FIG. 21, the device comprises a document plate 81, a document cover 82, a copy document 83, a sensor 84, and a reflective sheet 85. The sensor 84 comprises the LED and the light receiving element. These elements are identical with those as described above.

According to the present preferred embodiment, the sensor 84 travels the plate 81 with appropriate means.

When the sensor 84 passes the portion to direct its light toward the rear edge of the document 83, the light receiving element of the sensor 84 starts to receive the light reflected by the sheet 85, so that the light receiving signals reverse their signal level to thereby detect the rear edge of the document 83. The sensor 84 moves at constant speed along with and parallel to the document plate 81. The size of the document 83 can be calculated by multiplying the travel time of the sensor 84 between the leading edge of the document 83 and the rear edge of thereof, and the traveling speed of the sensor 84.

Usually, the document 83 is mounted on the plate 81 to be in contact with the edge of the plate 81. The sensor 84 is set so as to direct its light toward the document in contact with the edge of the plate 81. From this initial point, the sensor 84 travels to detect the rear edge of the document 83. The time is counted when the sensor 84 travels so as to direct its light toward the sheet 85. The time and the speed of the sensor 84 is multiplied to obtain the size of the document 83.

FIG. 23 shows a block diagram of a document lying detection circuit of the present invention.

The circuit of FIG. 23 comprises a signal generator 88, the sensor 84 comprising a LED 86 and a light receiving element 87, a differential circuit 89, an amplifier 90, an integration circuit 91, and a comparator 92.

The operation of this circuit is the same as that of the circuit of FIG. 6, so that any further detailed description with respect thereto is omitted.

The comparator 92 outputs the low level signal "L" when no document 83 is laid on the plate 81. When some document 83 is laid on the plate 81, the comparator 92 outputs the high level signal "H". When the sensor 84 travels to the rear edge of the document 83, the light receiving element 87 starts to receive the light reflected by the sheet 85, so that the comparator 92 changes the output from the high level signal "H" to the low level signal "L". Thus, the rear edge of the document 83 is detected. Responsive to the light receiving signal by the element 87, a size detecting circuit detects the document size as will be described below.

FIG. 24 shows the light reflection states relied upon by the travel position of the sensor 84.

FIG. 25 shows a preferred embodiment of the sensor traveling device. In this embodiment, a sensor 94 related to the sensor 84 is mounted on an optical scanning element 93 forming part of the optical scanning device 3 of FIG. 1. The element 94 travels along the plate 81 to provide the optical scanning light toward the plate 81 while the document table is still. The sensor 94 travels with the optical scanning element 93. Conventionally the element 93 is moved with wires.

In this preferred embodiment, the LED of the sensor 84 can be replaced by the element 93.

FIG. 26 shows a block diagram of a travel time counting circuit for counting the travel times of the sensor 94.

The circuit of FIG. 26 comprises the sensor 94, a magnet 95, an oscillator 96, a counter 97, and two AND gates 98 and 99. The magnet 95 closes two switches SW1 and SW2. The switch SW1 is related to the initial position of the sensor 94. The switch SW2 is related along the end of the plate 81 to which the sensor 94 travels. The output of the sensor 94 and the output from the switch SW2 are inputted into the AND gate 98. The output of the AND gate 98 and the output of the oscillator 96 are inputted into the AND gate 99 to output v3 pulses which are entered into the counter 97. The oscillator 96 provides oscillation signals. The counter 97 counts the number of the v3 pulse from the closing of the switch SW1 to the closing of the switch SW2, so that the traveling time of the sensor 94 is detected while the sensor 94 directs its light toward the document 83.

FIG. 27 shows a timing chart of the pulse signals occurring within the circuit of FIG. 26.

Since the sensor 94 is mounted on the element 93, the traveling speed of the sensor 93 is constant and known to the copying machine.

Based upon the traveling speed and the traveling times detected by the circuit of FIG. 26, the size of the document 83 can be calculated by the control circuit of the copying machine.

While only certain embodiments of the present invention have been described, it will be apparent to those skilled in the art that various changes and modifications may be made therein without departing from the spirit and scope the present invention as claimed.

What is claimed is:

1. A detecting device for detecting the size of a copy document for an electrophotographic copying machine comprising:

document table means on which the copy document is positioned;

document cover means pivotally provided on said document table means for covering the copy document;

sensor means for sensing the size of the copy document on said document table means, the copy document being subjected to optical scanning;

said sensor means having a light emitting element for emitting light in an incident direction and a light receiving element for receiving light wherein said emitting element is contiguous to said light receiving element;

reflective sheet means mounted under said document cover means for reflecting light from said light emitting element toward said light receiving element in a direction opposed to said incident light direction; and said light receiving element of said sensor means including a detection means responsive to an output from said light receiving element of said sensor means for calculating and detecting copy document sizes.

2. The device of claim 1, wherein said sensor means comprises a photodiode responsive to the light received from said light receiving element for generating a voltage.

3. The device of claim 1, wherein said detection means includes an operational amplifier means and a comparator means.

4. The device of claim 1, wherein said sensor is connected to an operational amplifier means and an output from said operational amplifier is applied to a comparator means.

5. The device of claim 1, wherein said detection means is a logic circuit.

6. The device of claim 1, wherein said sensor means is tilted toward the document plate for providing light directed at an angle toward the copy document.

7. The device of claim 6, further comprising a motor means, a potentiometer, and a motor driver circuit for pivotally rotating said tilted sensor means about a fixed axis.

8. The device of claim 1, wherein light emitted from said sensor means travels along said document table at a constant speed.

9. The device of claim 8, wherein said sensor means is mounted on an optical scanning element which moves the sensor means with respect to the document table at said constant speed.

10. A detecting device for detecting the size of a copy document for an electrophotographic copying machine comprising:

document table means on which the copy document is positioned;

document cover means pivotally provided on said document table means for covering the copy document;

at least one sensor means for sensing the size of the copy document on said document table means, the copy document being subjected to optical scanning, said sensor means having a light emitting element for emitting light in an incident direction and a light receiving element for receiving light in a direction opposed to said incident direction and wherein said light emitting element and said light receiving element are housed within said sensor means; and reflective sheet means mounted under said document cover means for reflecting light from said light emitting element in a direction opposed to said incident light direction, said reflective sheet including a material such that light reflected therefrom is in a direction opposed to said incident light direction and at a greater intensity than light reflected from said copy document;

said light receiving element of said sensor means including a detection means responsive to an output signal from said light receiving element of said sensor means for calculating and detecting copy document sizes.

11. The device of claim 10, wherein said sensor means comprises a photodiode responsive to the presence or absence of said reflective sheet means for generating a voltage.

12. The device of claim 10, wherein said detection means includes an operational amplifier means and a comparator means for amplifying said output signal wherein an output from said amplifier means is applied to said comparator means for generating high or low level signals according to the presence or absence of said copy document.

13. The device of claim 10, wherein said sensor means is connected to an operational amplifier means and said output from said operational amplifier is applied to a comparator means.

14. The device of claim 10, wherein said detection means is a logic circuit.

15. The device of claim 10, wherein said sensor means is tilted toward said document plate for providing light directed at an angle toward said copy document.

16. The device of claim 15, further comprising a motor means, a potentiometer, and a motor driver circuit for pivotally rotating said sensor means about a fixed axis whereby an angle determined from said tilted sensor corresponds to a size of said copy document to be copied.

17. The device of claim 10, wherein said sensor means travels along said document table at a constant speed for determining a size of said copy document to be copied.

18. The device of claim 17, wherein said sensor means is mounted on an optical scanning element for determining a size of said copy document to be copied.

* * * * *